United States Patent [19]
Sands et al.

[11] 3,874,924
[45] Apr. 1, 1975

[54] NON-HYGROSCOPIC, WATER-SOLUBLE SUGAR PRODUCTS AND PROCESS FOR PREPARING THE SAME

[75] Inventors: Michael A. Sands, Hackensack, N.J.; Santino Paul Marino, Tarrytown, N.Y.

[73] Assignee: CPC International, Inc., Englewood Cliffs, N.J.

[22] Filed: Sept. 13, 1973

[21] Appl. No.: 397,189

[52] U.S. Cl................ 127/29, 127/63, 426/162, 426/214
[51] Int. Cl. ................... A23g 3/00, C13f 3/00
[58] Field of Search ...... 426/213, 214, 162; 127/29, 127/30, 63

[56]  References Cited
UNITED STATES PATENTS

| | | | |
|---|---|---|---|
| 1,601,302 | 9/1926 | Farley | 426/214 |
| 2,818,356 | 12/1957 | Shoorhoff | 127/29 X |
| 3,140,201 | 7/1964 | Reimers | 127/30 X |
| 3,589,909 | 6/1971 | Godzickki | 426/214 X |
| 3,629,003 | 12/1971 | Suzuki | 127/30 |
| 3,642,535 | 2/1972 | Graham | 127/29 |
| 3,652,298 | 3/1972 | Mickevicz | 127/30 |
| 3,669,688 | 6/1972 | Thompson | 426/213 X |
| 3,736,149 | 5/1973 | Knapp | 426/213 X |

OTHER PUBLICATIONS
Chemical Abstracts, 75: 128661g (1971).

*Primary Examiner*—Morris O. Wolk
*Assistant Examiner*—Sidney Marantz
*Attorney, Agent, or Firm*—Albert P. Halluin; Frank E. Robbins

[57]     ABSTRACT

Non-hygroscopic, water-soluble sugar compositions which are prepared by grinding together in a dry, solid state, a white sugar component and a "pulverizing aid" in the form of a water-soluble maltodextrin having a measurable dextrose equivalent value not substantially above 20, said "pulverizing aid" being employed in amounts ranging from about 5 percent to about 20 percent by weight of said total composition, the resulting product having an average particle size such that 95% by weight of the composition passes through a 325 mesh, said composition being further characterized as having a ratio of weight average particle size to number average particle size of less than 2. The compositions are free-flowing powders useful in preparing icings, buttercreams and fudges.

17 Claims, No Drawings

NON-HYGROSCOPIC, WATER-SOLUBLE SUGAR PRODUCTS AND PROCESS FOR PREPARING THE SAME

BACKGROUND OF THE INVENTION

1. Field Of The Invention

The present invention relates to non-hygroscopic, water-soluble fondants and, more particularly, to an improved dry powdered fondant product, and an improved process for producing the powdered fondants economically and in commercial quantities. The term "fondant" as used herein is to be understood as comprising a mixture of microscopic granular sugar particles and sugar syrup for use as the center of chocolate creams, fudges, icings and similar uses.

2. Description Of The Prior Art

Fondant sugar used in the confectionery art generally has a very fine particle size such that the particles tend to agglomerate or adhere to each other and to other surfaces. This undesirable property renders it difficult to properly proportion and otherwise use such products. Various additives have been employed in an effort to overcome these objections. Such additives have included starch, corn syrup solids, invert sugar, water-insoluble cellulose, and the like. Such products and processes for producing the same are described in the patent literature, e.g., U.S. Pat. Nos. 2,231,835, 2,299,287, 2,828,356, 2,824,808, 3,085,914, 3,140,201, 3,365,331, 3,518,095, and 3,652,298 and British Pat. Specification No. 1,007,109.

The most commonly used additive in connection with powdered fondant sugars is corn starch, which has been used as a non-caking additive since it is substantially white, relatively odor-free, and inexpensive and it is commonly copulverized in granular form with the sugar at the refinery.

Although corn starch is generally useful as a non-caking aid for powdered sugars, there are several disadvantages occasioned by its use from the standpoint of manufacturing and the ultimate product which contains the starch. The disadvantages generally are occasioned by the fact that three parts by weight of the starch per 100 parts by weight of the fondant sugar are employed to achieve the desired non-caking advantage. The use of the aforesaid amount of starch in the fondant renders the product difficult to manufacture, since the starch tends to clog-up in the sugar grinders and interferes with the sugar recovery systems. In addition, the starch has a tendency to absorb water and forms heavy, viscous masses when the fondant is used in a powdered icing and the starch also tends to gelatinize when the fondant is placed in boiling water.

Other fondant products which have attempted to overcome with the above disadvantages have included processes wherein a syrup such as invert is added to the powdered sugar. Many products produced by this type of process are commercially available under the tradenames Amerfond (described in U.S. Pat. No. 3,365,331), DriFond, etc. While these products have enjoyed widespread commercial success, they are quite often considered undesirable due to their hygroscopicity or tendency to cake. Some products contain both invert sugar or corn syrup solids and starch with the powdered sugar. Such products are disclosed and claimed in the pioneering patented invention of Wadsworth et al., U.S. Pat. No. 3,085,914.

Still another process for providing free-flowing fondant sugar is disclosed in U.S. Pat. No. 3,652,298, wherein a water-insoluble cellulose is added to the powdered sugar. While these products are free-flowing and relatively non-caking, the products do not provide the proper water-solubility necessary for many uses in the fondant industry.

SUMMARY OF THE INVENTION

The present invention relates to a new, free-flowing, copulverized sugar composition prepared by grinding together in a dry, solid state, a white sugar component and a "pulverizing aid" in the form of a water-soluble maltodextrin having a measurable dextrose equivalent value not substantially above about 20, said "pulverizing aid" being employed in amounts ranging from about 5% to about 20 percent by weight of said total composition, the resultant product having an average particle size wherein at least 95 percent by weight passes through a 325 mesh, said novel composition being further characterized as having a ratio of weight average particle size to number average particle size of less than about 2. Preferably, the new composition of the invention will contain from about 7 percent to about 12% of the "pulverizing aid" in the total composition.

The present invention is also directed to novel icings, buttercreams and fudges prepared from the pulverized sugar compositions of the present invention.

DESCRIPTION OF THE PREFERRED EMBODIMENTS

The white sugar component employed in the practice of the present invention includes any type of crystalline sugar product, examples of which include dextrose, sucrose, lactose and blends thereof. Many of these sugars are well-known in the art and are conventional articles of commerce sold under various tradenames. Such sugars are generally produced and crystallized by conventional techniques. The preferred white sugar component employed in the practice of the present invention is sucrose.

The "pulverizing aid" in the form of a water-soluble maltodextrin having a measurable dextrose equivalent value not substantially above about 20 utilized in the practice of the present invention represents a known class of materials. The maltodextrins are also known as hydrolyzed cereal solids and such materials are commercially available under the tradenames Mor-Rex, manufactured and sold by CPC International Inc., Maltrin, manufactured and sold by Grain Processing Corporation, Frodex, manufactured by American Maize-Products Company, and Star-Dri 15, manufactured by A. E. Staley Manufacturing Company.

The terms "maltodextrins" and "hydrolyzed cereal solids" herein refer to those starch conversion products having a relatively small amount of dextrose and maltose. Generally, the dextrose content of the maltodextrins is less than about 2.4 percent by weight and the amount of maltose is less than about 9 percent by weight. As it is well-known in the industry, the dextrose equivalent value in a starch conversion product having a value above about 20 is generally referred to as a corn syrup solid; whereas starch conversion products having only a trace amount of dextrose as hereinabove referred to, are known as hydrolyzed cereal solids or maltodextrins. It is the maltodextrins described hereinabove which are employed in the practice of this invention for the preparation of the non-hygroscopic water-soluble sugar compositions. The corn syrup solids having a dextrose equivalent value greater than about 20 are not suitable in the practice of the present invention, since these products do not possess the proper properties to effectively cause pulverization and thereby produce a sugar composition. The corn syrup solids are also extremely hygroscopic, a property undesirable from the standpoint of flowability and storing. In other words, the corn syrup solids tend to provide a sugar composition which will cake or form lumps when stored.

The preferred maltodextrins or hydrolyzed cereal solids employed in the practice of the present invention are characterized as having a descriptive ratio of at least about 2. The descriptive ratio is the sum of the percentages (dry basis) of saccharides of the maltodextrin with a degree of polymerization of 1 to 6 divided by the dextrose equivalent value. An especially preferred class of maltodextrins employed in the practice of the present invention are derived from waxy starch hydrolysates and have a dextrose equivalent value in the range of from about 9 to about 13 and a descriptive ratio of at least about 2. These starch hydrolysates or maltodextrins are prepared by the method disclosed in British Pat. No. 1,203,048, particularly Examples III and IV, and the corresponding disclosure and claims in U.S. application Ser. No. 181,566, the disclosures of which is incorporated herein by reference. These waxy starch hydrolysates or maltodextrins are commercially available under the tradename of Mor-Rex 1918, manufactured and sold by CPC International Inc.

The term "measurable dextrose equivalent value" (D.E.) referred to herein, is defined as the reducing value of the hydrolysate material compared to the reducing value of an equal weight of dextrose, expressed as percent, dry basis, i.e., $$D.E. = \text{Reducing Value of Hydrolysate Material}/\text{Reducing Value of Dextrose} \times 100$$

In the above equation, an equal weight of each of dextrose and the hydrolysate material is involved. The term dextrose equivalent value of a starch hydrolysate is a common expression in the art for describing the total reducing sugars content of a mterial calculated as dextrose and expressed as percent, dry basis.

It has been discovered that the hereinabove described water-soluble maltodextrins not only aid in the pulverization of the white sugar component, but also co-act with the pulverized white sugar component, such as sucrose, to inhibit sugar crystallization which leads to cracking and crazing in icing formulations. It is believed that the inhibiting effect is attributed to the extremely low rate of moisture absorption the water-soluble maltodextrin has on the pulverisate as a result of the copulverization. It has also been discovered that the water-soluble maltodextrins, when copulverized with the white sugar component, exhibit a more rapid setting time, thereby reducing dripping and sticking, and resulting in a clean, brilliant glazing composition.

An essential aspect of the present invention comprises copulverizing a white sugar component such as sucrose with the hereinabove described water-soluble maltodextrin. It is believed that the high shear forces accomplished during the copulverization cause the water-soluble maltodextrin to encase the minute white sugar particles so as to provide the unique free-flowing product of the invention. The copulverization can be accomplished by any suitable apparatus generally employed to prepare fondant sugars from granular sugar. A particularly preferred pulverizer suitable for the practice of the present invention includes the MIKRO ACM PULVERIZER, manufactured by MikroPul, a division of the Slick Corporation, Summit, New Jersey. These pulverizers or comminuting machines are described, for example, in U.S. Pat. No. 3,285,523 to Duyckinck et al., the disclosure of which is incorporated herein by reference.

The process of copulverizing the white sugar component and the pulverizing aid may be simply accomplished by first dry blending the white sugar component, such as granular sucrose with the "pulverizing aid" and thereafter feeding the blend into the pulverizing machine. Alternatively, the white sugar component, such as granular sucrose, and the "pulverizing aid" may be metered into the pulverizing machine. It is preferred to blend the materials together prior to feeding them into the pulverizing machine. This blending step can be accomplished by utilizing the feeding hopper generally provided with most pulverizing machines.

The copulverization is preferably carried out at ambient temperatures, i.e., a temperature ranging from about 15° to about 50°C. Due to the high shear forces accompanying the copulverization of the white sugar component and the "pulverizing aid," the temperature of the resulting product is somewhat higher than the feed blend. With most pulverizers, such as the air classification machine described in U.S. Pat. No. 3,285,523, temperature problems do not generally occur.

It has been unexpectedly discovered that the use of the hereinabove described "pulverizing aid" actually facilitates the copulverization operation. Thus, the blending of the "pulverizing aid" with the granular white sugar component prior to pulverization improves the efficiency in manufacturing the fondant sugar product, as well as provides a product having unique and beneficial properties.

If desired, other materials commonly added to the white sugar component during comminution may be included, such as starch, cellulose products, etc. Generally, these additives will be present in amounts ranging from 0–3 percent by weight of the total composition, preferably from about 0.1 percent to about 1% by weight. Even though these products, such as sugar grinders starch, generally interfere with the pulverization of granular sugar when used in quantities amounting up to about 3 percent by weight or more, the use of the "pulverizing aid" of the present invention alleviates the problems heretofore associated with these materials. In addition, it has been found that the use of a small amount of the conventional additives, i.e., from about 0.1 percent to about 1 percent by weight of sugar grinders starch in combination with the "pulverizing aid," provides exceptional beneficial results from the standpoint of processing and flowability.

In a typical example, 91 parts by weight of granular sucrose is dry blended with 8 parts by weight of a water-soluble maltodextrin (the "pulverizing aid") and 1 part by weight of sugar grinders starch or Amijel. The blend is fed into an air classification machine such as the machine disclosed in U.S. Pat. No. 3,285,523 which is adjusted to produce a comminuted product such that more than 95 percent passes through a 325 mesh screen. The resulting product is a copulverized, water-soluble, non-hygroscopic, free-flowing product which is suitable for use or packaging.

Typically, the free-flowing sugar compositions of the present invention will be comprised of from about 5 percent to about 20% by weight of the "pulverizing aid," i.e., the water-soluble maltodextrin having a measurable dextrose equivalent value not substantially above about 20, from about 77 percent to about 94 percent by weight of the white sugar component, i.e., sucrose, and from about 0 percent to about 3 percent by weight of sugar grinders starch, all copulverized such that 95 percent of the product passes through a 325 mesh screen. A preferred composition of the invention will be comprised of from about 7 percent to about 12 percent by weight of the "pulverizing aid," from about 86 percent to about 92 percent by weight of sucrose and from about 0 percent to about 2 percent by weight of a sugar grinders starch copulverized such that more than 95 percent of the product passes through a 325 mesh screen.

The following examples further illustrate the present invention and will enable others skilled in the art to understand it more completely. It should be understood, however, that the invention is not limited solely to the particular examples given below. The parts are parts by weight, unless otherwise indicated.

EXAMPLE 1

A series of dry fondants were dry blended by mixing the following formulations:

|      | Powdered Cane Sugar (No Starch) | Powdered Starch | Amijel | Maltodextrin* |
|------|------|------|------|------|
| I    | 80 | 3 | — | 17 |
| II   | 80 | — | 3 | 17 |
| III  | 85 | 3 | — | 12 |
| IV   | 85 | — | 3 | 12 |
| V    | 90 | 2 | — | 8 |
| VI   | 90 | — | 2 | 8 |
| VII  | 91 | 2 | — | 7 |
| VIII | 91 | — | 2 | 7 |
| IX   | 91 | 1 | — | 8 |
| X    | 91 | — | 1 | 8 |
| XI   | 90 | — | — | 10 |
| XII  | 90% cane sugar, 2% starch, 8% corn syrup solids (U.S. Pat. No. 3,085,914) | | | |
| Amerfond | 95% cane sugar, 5% invert (Amstar) (U.S. Pat. No. 3,365,331) | | | |

*Mor-Rex 1918, a waxy starch hydrolysate having a D.E in the range of from about 9–13 and a description ratio of about 2 or more.

Simple icings were made from each dry fondant formulation by blending the formulations with 14 percent by weight water. All of the icings in which Amijel and the maltodextrin were used were gritty and were not acceptable.

A portion of the dry-blended formulation of IX (91 parts by weight powdered cane sugar, 1 part by weight powdered starch and 8 parts by weight of the maltodextrin) was copulverized to fines of less than 6X (more than 95 percent through a 325 mesh. A simple icing was prepared from the copulverized blend. The icing had good texture and it was not gritty. The product, when subjected to a taste panel, was very acceptable. The dry blends of formulations VII and IX were used for the preparation of buttercream icings. Both formulations gave icings having good appearance, color and consistency; but, both were gritty. Due to the grittiness these icings derived from the dry-blended products, they were not acceptable.

A buttercream icing was prepared from formulation IX which had been copulverized to about 6X (i.e., more than 95 percent through a 325 mesh), and the resulting product had a remarkably improved texture and it did not possess any grittiness. The product was very acceptable to a taste panel.

EXAMPLE 2

Five samples of sugar blends consisting of granular cane sucrose, maltodextrin as the "pulverizing aid" (Mor-Rex 1918, a waxy starch hydrolysate having a D.E. in the range from about 9–13 and a descriptive ratio of about 2 or more), corn syrup solids (as a comparison in place of the maltodextrin), and optionally, sugar grinders starch were copulverized in an ACM (air classification machine) manufactured by Mikro-Pul (as described in U.S. Pat. No. 3,285,523, and designated as the Mikro ACM Pulverizer Model 10) to a fineness of 95 percent through a 325 mesh screen. One of the five blends was copulverized such that more than 95 percent of the comminuted product passed through a 400 mesh. The sugar and added materials, such as the "pulverizing aid" were first dry blended to provide a homogeneous mixture. A control sample of the granular cane sugar was initially fed into the pulverizer to compare the pulverization efficiency of the sugar with and without the "pulverizing aid." The output capacity of the pulverization was ascertained for each sample and recorded. All of the samples, including the control, were conducted under the same operating conditions of power, airflow, etc. Table 1 summarizes the details and results of the pulverization experiment.

TABLE 1

| Blend No. | TEST SAMPLE | | | Feed Temperature, °F | Mill Outlet Temperature, °F | Output Capacity |
|---|---|---|---|---|---|---|
| | Sucrose (Parts By Wt.) | Starch (Parts By Wt.) | Pulverizing Aid (Parts By Wt.) | | | |
| O | 100 | — | — | 64 | 73 | 168 |
| A | 93 | 2 | 5[1] | 68 | 75 | 272[3] |
| B | 91 | 1 | 8[2] | 70 | 85 | 215[5] |
| C | 92 | — | 8[1] | 70 | 98 | 330 |
| D | 91 | 1 | 8[1] | 70 | 90 | 273 |
| E | 91 | 1 | 8[1] | 70 | 80 | 41[4] |

[1]Maltodextrin, Mor-Rex 1918, having a D.E. of 9–13 and a descriptive ratio of 2 or more.
[2]Corn syrup solids (high maltose containing).
[3]Average of 3 runs, 228, 276 and 314 lbs./hr., respectively.
[4]Pulverized such that greater than 95% passes through 400 mesh.
[5]Final product was sticky and had a tendency to form lumps.

As it can be seen from the data in Table 1, the use of the "pulverizing aid" in the form of a maltodextrin greatly improves the efficiency of the pulverization, i.e., the output capacity of the pulverizer increased from 168 lbs./hr. for pure granular cane sugar to well over 200 lbs./hr. using the same amount of power supply when a "pulverizing aid" is blended with the sugar. Thus, the invention provides a means for greatly improving the efficiency and yield/power output in pulverizing granular cane sugar. Sample E had a lower capacity output in spite of the use of a "pulverizing aid," since the particle size setting was far more demanding than the control and samples A-D. Thus, sample E does not represent a direct comparison insofar as capacity output, as is the case of the control and samples A-D.

Samples A-E, as set forth in Table 1, were further analyzed to ascertain their physical properties. The samples were first analyzed to ascertain their particle size distribution using a Coulter Counter Analyzer (Program CC was used with data from the Coulter Model M, paragraph 15, which refers the operator to Section 6, paragraph 20). It states that any given combination of dial settings will represent a specific particle volume. The particle volume may be calculated by using the equation $-V = K \times A \times I \times$ lower threshold. Using the Coulter Counter Analyzer, the number average particle size and the weight average particle size in micrometers for each sample was ascertained and recorded. The results of the analysis and the ratio of the weight average particle size/number average particle size are set forth in Table 2.

[1]Maltodextrin, Mor-Rex 1918, having a D.E. of 9-13 and a descriptive ratio of 2 or more. [2]Corn syrup solids (high maltose containing).

As it can be seen from the data in Table 2, the copulverized sugar product of the invention has a narrow particle size distribution such that the ratio of the weight average particle size to the number average particle size is not substantially above about 2, and the ratio is generally about 1.5 or less. The aforesaid particle size distribution is an important feature attributed to the product of the invention, since it provides better flowability, and uniform solubility to the product. Furthermore, the narrow particle size distribution provides a product which will produce a smoother, less gritty product when made into icings, fudges and creams.

The copulverized samples (samples A-E) set forth in Table 1 were further analyzed to ascertain the general physical characteristics, such as moisture, protein, Angle of Repose, caking hardness. These analyses were compared with the commerical products, Amerfond, a sucrose/invert product made by Amstar, and Drifond. The results of this analysis is set forth in Table 3.

TABLE 3

Analysis Of Copulverized Sugars

| Sample No. | A | B | C | D | E | Amerfond | Drifond |
|---|---|---|---|---|---|---|---|
| Sucrose, % by Wt. | 93 | 91 | 92 | 91 | 91 | — | — |
| Starch, % by Wt. | 2 | 1 | — | 1 | 1 | — | — |
| Pulverizing Aid, % by Wt. | 5[1] | 8[2] | 8[1] | 8[1] | 8[1] | — | — |
| Moisture, % | 0.5 | 0.5 | 0.4 | 0.5 | 0.6 | 0.5 | — |
| Protein, % | 0.02 | 0.01 | 0.01 | 0.01 | 0.01 | — | — |
| Angle of Repose, ° | 49.4 | 48.9 | 49.4 | 51.4 | 46.2 | 39.7 | 31.9 |
| Caking Hardness, psi | 10.4 | 10.7 | 10.9 | 14.1 | 15.4 | — | — |

[1]Maltodextrin, Mor-Rex 1918, having a D.E. of 9-13 and a descriptive ratio of 2 or more.
[2]Corn syrup solids (high maltose containing).

Further analyses of copulverized samples A-E were made to ascertain their hygroscopicity at 90 percent relative humidity. The results were reported as absolute weight gain (weight increase × 100, divided by original sample weight). The results of this analysis are set forth in Table 4.

TABLE 2

| Sample No. | A | B | C | D | E |
|---|---|---|---|---|---|
| Sucrose, % by Wt. | 93 | 91 | 92 | 91 | 91 |
| Starch, % by Wt. | 2 | 1 | — | 1 | 1 |
| Pulverizing Aid, % by Wt. | 5[1] | 8[2] | 8[1] | 8[1] | 8[1] |
| Number Average Particle Size (Micrometers) | 25.2 | 24.5 | 24.0 | 25.3 | 15.4 |
| Weight Average Particle Size (Micrometers) | 37.6 | 36.6 | 37.0 | 37.7 | 23.0 |
| Ratio of Wt. Avg. Particle Size/Number Avg. Particle Size | 1.47 | 1.49 | 1.54 | 1.49 | 1.49 |

TABLE 4

Hygroscopicity Of Copulverized Sugars
At 90% Relative Humidity

| Sample No. | A | B | C | D | E |
|---|---|---|---|---|---|
| Sucrose, % by Wt. | 93 | 91 | 92 | 91 | 91 |
| Starch, % by Wt. | 2 | 1 | — | 1 | 1 |
| Pulverizing Aid, % by Wt. | 5[1] | 8[2] | 8[1] | 8[1] | 8[1] |
| Moisture Gain, % | | | | | |
| One day | 8 | 13 | 10 | 8 | 7 |
| Three days | 21 | 30 | 22 | 18 | 17 |
| Four days | 27 | 38 | 29 | 24 | 22 |
| Seven days | 44 | 61 | 49 | 39 | 37 |

[1]Maltodextrin, Mor-Rex 1918, having a D.E. of 9–13 and a descriptive ratio of 2 or more.
[2]Corn syrup solids (high maltose containing).

As it can be seen from the data in Table 4, the copulverized sugar containing corn syrup solids (sample B) is far more hygroscopic than the samples copulverized with the maltodextrin. Thus, the use of the maltodextrin provides a product which is more free-flowing, non-hygroscopic and non-caking than the products copulverized with corn syrup solids. The free-flowing and non-caking features of the products of the invention are very important characteristics, inasmuch as the products can be stored under relatively normal conditions without solidification due to caking and lumping. In other words, the copulverized sugar product of the present invention provides an improved shelf-live over the fondant sugar products of the prior art and the copulverized sugar product containing corn syrup solids.

EXAMPLE 3

This example describes the preparation of several fondant icings and creams employing the copulverized sugar compositions described as samples A-E of Example 2.

Two types of icings were made to evaluate the copulverized sugars of the present invention. In addition, icings were prepared from a laboratory blend of 92 percent by weight of 6X sucrose and 8% high maltose corn syrup solids, Amerfond and pure powdered sucrose. The recipes were as follows:

Vanilla Fudge

| Icing Sugar | 72.2 parts | (a) | Mix at low speed until incorporated, scraping bowl well. |
|---|---|---|---|
| Water | 10.1 parts | | |
| Salt | .4 part | (b) | Mix at medium speed until smooth (about 3 minutes). |
| Regular corn syrup | 7.2 parts | (c) | Add and repeat above. |
| Non-fat milk solids | 2.9 parts | | |
| Vanilla | as desired | | |
| Betricing 370 Shortening (Durkee) | 7.2 parts | (d) | Add and repeat above. |

Chocolate Buttercream

| Icing sugar | 51.9 parts | (a) | Stir together |
|---|---|---|---|
| Dutched cocoa | 5.2 parts | | |
| Non-fat milk solids | 2.1 parts | | |
| Water | 7.5 parts | (b) | Incorporate and mix at low speed. |
| Betricing 370 | 24.9 parts | (c) | Incorporate each ingredient thoroughly, scraping bowl well; beat with wire whip until light at medium speed (5 minutes). |
| Margarine | 8.3 parts | | |
| Vanilla | as desired | | |

The icings were evaluated on small cakes and after storage in covered paper cans. Penetrometer measurements were taken after one week and two weeks. The results reported are an average of from three to five measurements on each icing. Appearance and flavor differences were minimal among the icings of each type made from the various sugars. The results of the tests are set forth in Table 5.

The data in Table 5 illustrate the drying or crust forming tendencies of the icings made with all of the fondant sugars after one week and two weeks on cakes and in covered paper cans. The data represent millimeters of penetration into the icing in a given time interval (5 seconds). Therefore, the higher the reported number, the softer the icing. The penetrometer data in Table 5 illustrate that with the chocolate buttercream recipe, the copulverized sugars of the present invention compared well with the 6X sucrose and Amerfond icings. In the vanilla fudge icings, the data show that the icings prepared from the copulverized sugars of the present invention (i.e., those copulverized with the maltodextrin "pulverizing aid") made icings which were equivalent or superior to the icings made with 6X sucrose, Amerfond or corn syrup solids. It is apparent from the above that the copulverized sugar compositions of the present invention are capable of providing icings which are comparable or superior to the prior art and commerically available fondant sugars. Moreover, the icings made from the copulverized sugar compositions had excellent taste characteristics as compared with the icings prepared from the prior art and commercially available fondant sugars. This latter result was unexpected due to the large amount of the non-sugar component present in the copulverized composition.

The copulverized sugar compositions of the present invention which can be prepared more economically and have a better shelf-life than the prior art fondant sugars represent a marked advance in the art of fondant sugars. The advance made by the present invention is particularly noteworthy when it can be seen from (1) the data in Table 1 that the "pulverizing aid" in the form of the maltodextrin greatly improves the pulverization of the granulated sugar, (2) the data in Table 4,

TABLE 5

| Sample No. | Crust Forming Tendencies Of Icings As Evaluated By Penetration Tests | | | | | | Amer-fond | Pure Powdered 6X Sucrose |
|---|---|---|---|---|---|---|---|---|
| | A | B | C | D | E | F[3] | | |
| Sucrose, % by Wt. | 93 | 91 | 92 | 91 | 91 | 92 | — | 100 |
| Starch, % by Wt. | 2 | 1 | — | 1 | 1 | — | — | — |
| Pulverizing Aid, % by Wt. | 5[1] | 8[2] | 8[1] | 8[1] | 8[1] | 8[2] | — | — |
| Vanilla Fudge Icings: | | | | | | | | |
| Penetration, mm. (One Week) | | | | | | | | |
| In paper cans | 5.2 | 4.0 | 4.9 | 7.9 | 5.1 | 8.8 | 8.8 | 6.4 |
| On snack cakes | 2.1 | 2.1 | 4.5 | 7.0 | 6.9 | 5.5 | 4.2 | 3.1 |
| Penetration, mm. (Two Weeks) | | | | | | | | |
| In paper cans | 2.2 | 4.2 | 1.6 | 3.9 | 3.5 | 3.8 | 2.2 | 2.2 |
| On snack cakes | 0.7 | 1.6 | 2.6 | 2.4 | 3.4 | 2.2 | 1.4 | 0.9 |
| Chocolate Buttercream Icings: | | | | | | | | |
| Penetration, mm. (One Week) | | | | | | | | |
| In paper cans | 9.7 | 9.0 | 8.9 | 10.2 | 9.5 | 12.1 | 9.9 | 11.4 |
| On snack cakes | 5.4 | 7.0 | 4.7 | 6.2 | 4.7 | 10.1 | 8.0 | 8.6 |
| Penetration, mm (Two Weeks) | | | | | | | | |
| In paper cans | 6.7 | 9.8 | 7.4 | 7.6 | 6.8 | 10.5 | 7.9 | 10.3 |
| On snack cakes | 3.6 | 5.1 | 4.6 | 3.5 | 2.6 | 6.0 | 9.8 | 8.2 |

[1]Maltodextrin, Mor-Rex 1918, having a D.E. of 9–13 and a descriptive ratio of 2 or more.
[2]Corn syrup solids (high maltose containing).
[3]Laboratory blend.

which illustrates that the copulverized sugar compositions of the present invention are less hygroscopic, and thus have a lesser tendency to form lumps than the corn syrup solids copulverized sugar composition, and (3) the data in Table 5 and the taste tests which demonstrate that the copulverized sugar compositions of the present invention are capable of providing icings which are either comparable or superior to those of the prior art. Thus, the present invention provides a plurality of unique advantages which coalesce to provide the art with an improved process and product in the fondant sugar art. In addition, since the "pulverizing aid" of the present invention, which replaces up to about 20 percent by weight of the sugar component, has good bulk density, the total composition has a bulk density similar to the prior art fondant sugars.

As an additional demonstration of the use of the copulverized sugar compositions, doughnut glazes were prepared from the copulverized sugar product of Example 2, sample D. The glaze was prepared by adding 12 parts of hot water to 50 parts of the copulverized sugar with thorough mixing. The copulverized sugar immediately dissolved in the water. Warm doughnuts were dipped into the glaze mix and thereafter placed on a rack to allow the excess glaze to drip off. The glaze on the doughnuts was rated as superb and had an excellent taste. Furthermore, the glaze did not have as much stickiness as is generally associated with doughnut glazes.

Soft candy mints were prepared from the copulverized sugar compositions of the invention using the following formulation: a gelatin solution was prepared by dissolving 7 grams of 225 bloom gelatin in 700 milliliters of boiling water (the mixture was heated to completely solubilize the gelatin). To 30 milliliters of the hot solution there was added 225 grams of the copulverized sugar (Example 2, sample D), while stirring vigorously. After thorough mixing, flavoring was added, mixed, and the candy was poured onto a slab to cool. The candy had a good texture and taste, and was not appreciably sticky to the touch.

It has been found that if the "pulverizing aid" is employed in a quantity of less than about 5% by weight of the white sugar component, the improved processability and hygroscopicity properties will not be significantly apparent, whereas if the "pulverizing aid" is employed in amounts in excess of about 20 percent by weight of the white sugar component, the resulting copulverized sugar composition tends to take on or assume, to an objectionable degree, the characteristics of the "pulverizing aid" and to depart from or lose the desired characteristics of the primary sugar component.

As alluded to hereinabove, the new copulverized sugar products of the present invention have a number of desirable advantages and characteristics over prior art fondant sugar products, including (1) they are extremely water-soluble and can therefore be easily used to make a variety of confectionery products which require water-solubility for their preparation, (2) they are relatively non-hygroscopic, which enables them to be more free-flowing and storable for long periods of time without the formation of undesirable lumps or cakes; (3) they are cheaper to manufacture because the "pulverizing aid" facilitates the pulverization process; (4) they have a bulk density similar to the fondant sugars of the prior art; and (5) they are capable of providing superior icings and glazes.

As it can be seen from the above, the present invention provides a unique process wherein a "pulverizing aid" in the form of a maltodextrin having a measurable dextrose equivalent value not substantially above about 20 improves the pulverization of granulated cane sugars such as sucrose. The copulverized sugar product of the present invention, due to the improved efficient copulverization, has a narrow particle size distribution wherein the particle size of substantially all of the copulverized sugar product is generally not substantially above about 40 microns.

It will be appreciated that sugar materials other than granulated sucrose can be used in the practice of the present invention, such as blends of granulated sucrose and dextrose (in its anhydrous or monohydrate form), dextrose, levulose or lactose.

While reference has been made to the use of the Air Classification Machines described in U.S. Pat. No. 3,285,523, it will be appreciated that other comminuting machines are suitable, such as the machines described in U.S. Pat. Nos. 3,241,776 and 3,436,025 and the machines known as Mikroatomizers.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention. We Claim:

1. A copulverized, non-hygroscopic, free-flowing, water-soluble sugar composition comprising a white sugar component copulverized with a "pulverizing aid" in the form of a water-soluble maltodextrin having a measurable dextrose equivalent value not substantially above about 20, said "pulverizing aid" ranging from about 5 percent to about 20 percent by weight of said sugar composition, said sugar composition having an average particle size range such that at least about 95 percent passes through a 325 mesh screen, said sugar composition having a ratio of weight average particle size to number average particle size of less than about 2.

2. The copulverized sugar composition of claim 1, wherein said "pulverizing aid" is present in amounts ranging from about 7 percent to about 12 percent by weight said sugar composition.

3. The copulverized sugar composition of claim 1, wherein said "pulverizing aid" is a maltodextrin having a D.E. in the range of 9–13, has a descriptive ratio of about 2 or more, and is derived from a waxy starch.

4. The copulverized sugar composition of claim 1, wherein said white sugar component is sucrose which is present in amounts ranging from about 77 percent to about 94 percent by weight of the sugar composition, and said "pulverizing aid" is present in amounts ranging from about 5 percent to about 20 percent by weight based on the weight of the sugar composition.

5. The copulverized sugar composition of claim 1, wherein said composition additionally contains up to about 3 percent by weight of a starch or a cellulose-derived product.

6. The copulverized sugar composition of claim 1, wherein said composition additionally contains from about 0.1 percent to about 1 percent by weight of sugar grinders starch based on the weight of the sugar composition.

7. A copulverized, non-hygroscopic, free-flowing, water-soluble sugar composition comprising a copulverized mixture of from about 86 percent to about 92 percent by weight of sucrose, from about 7 percent to about 12 percent by weight of a "pulverizing aid" in the form of a water-soluble maltodextrin having a measurable dextrose equivalent value not substantially above about 20, and from about 0 percent to about 2 percent by weight of a sugar grinders starch said % by weight based on the weight of sugar composition, said sugar composition being characterized as having an average particle size range such that at least about 95 percent passes through a 325 mesh screen, said composition being further characterized as having a ratio of weight average particle size to number average particle size of less than about 2.

8. The copulverized sugar composition of claim 7, wherein said "pulverizing aid" is a maltodextrin having a D.E. in the range of 9–13, has a descriptive ratio of about 2 or more, and is derived from a waxy starch.

9. The copulverized sugar composition of claim 7, wherein said composition additionally contains from about 0.1 percent to about 1 percent by weight of sugar grinders starch based on the weight of the sugar composition.

10. A process for preparing a non-hygroscopic, water-soluble sugar composition comprising: copulverizing in a dry, solid state, a white sugar component and a "pulverizing aid" in the form of a water-soluble maltodextrin having a measurable dextrose equivalent value not substantially above about 20, said "pulverizing aid" ranging from about 5 percent to about 20 percent by weight of said sugar composition, continuing the copulverization until substantially all of the copulverized particles are not substantially above about 40 microns in size.

11. The process of claim 10, wherein said "pulverizing aid" is present in amounts ranging from about 7 percent to about 12 percent by weight, based on the said sugar composition.

12. The process of claim 10, wherein said "pulverizing aid" is a maltodextrin having a D.E. in the range of 9–13, having a descriptive ratio of about 2 or more, and being derived from a waxy starch.

13. The process of claim 10, wherein said white sugar component is granulated sucrose.

14. The process of claim 10, wherein said copulverization is conducted in the presence of up to about 3 percent by weight of a starch or cellulose-derived product based on the weight of the sugar composition.

15. A process for preparing a non-hygroscopic, water-soluble sugar composition comprising: copulverizing in a dry, solid state, of from about 86 percent to about 92 percent by weight of a granulated sucrose, from about 7 percent to about 12 percent by weight of a "pulverizing aid" in the form of a water-soluble maltodextrin having a measurable dextrose equivalent value not substantially above about 20, and from about 0 percent to about 2 percent by weight of a sugar grinders starch, continuing the copulverization until substantially all of the copulverized particles are not substantially above about 40 microns in size.

16. The process of claim 15, wherein said "pulverizing aid" is a maltodextrin having a D.E. in the range of 9–13, a descriptive ratio of about 2 or more, and being derived from a waxy starch.

17. The process of claim 15, wherein said sugar grinders starch is present in amounts ranging from about 0.1 percent to about 1 percent by weight.

\* \* \* \* \*